March 28, 1967  B. G. NIXON ETAL  3,310,981
DYNAMOMETERS
Filed Oct. 8, 1964  2 Sheets-Sheet 1
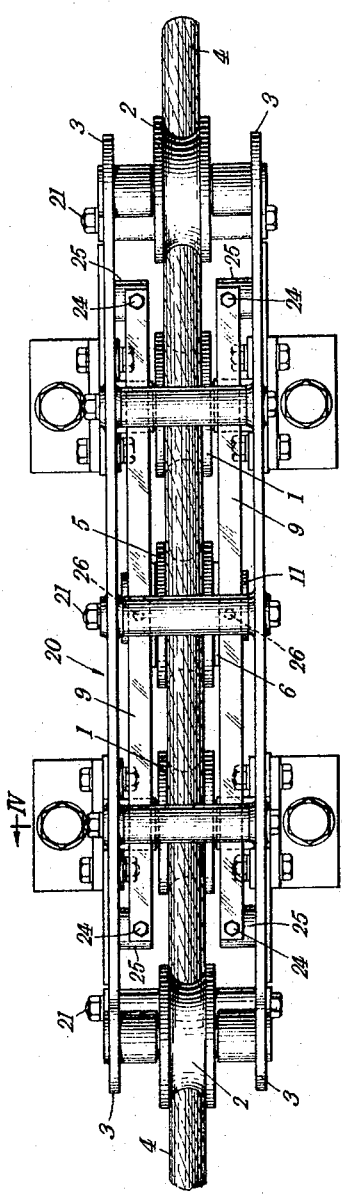
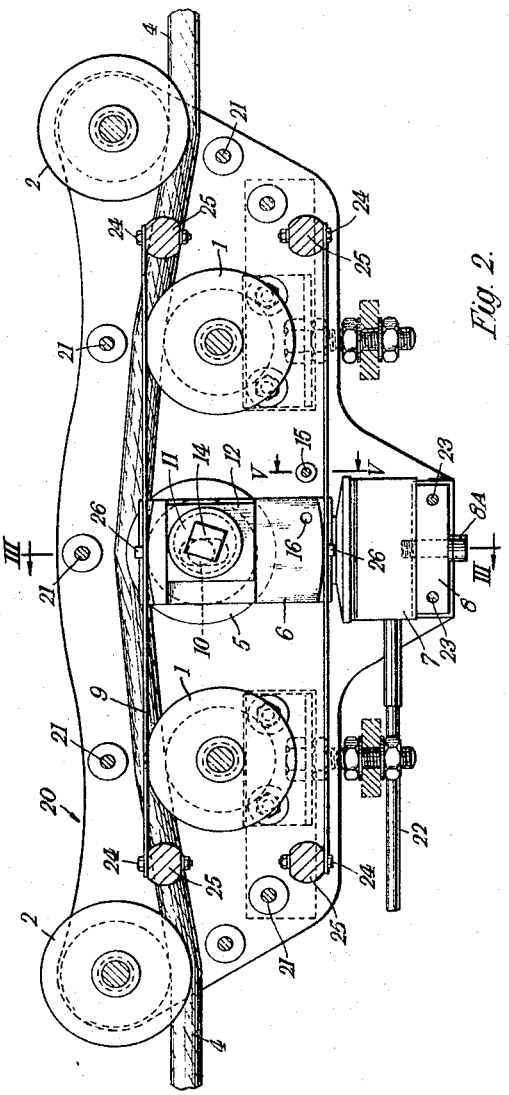
INVENTORS
Brian H. Nixon
Roy C. Preston
By Watson, Cole, Grindle & Watson
ATTORNEYS March 28, 1967   B. G. NIXON ETAL   3,310,981
DYNAMOMETERS
Filed Oct. 8, 1964   2 Sheets-Sheet 2
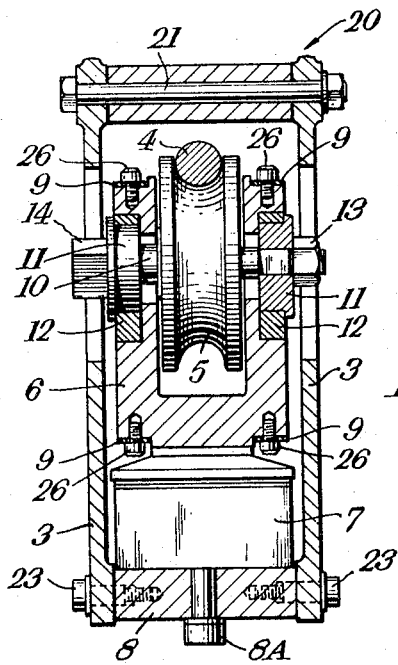
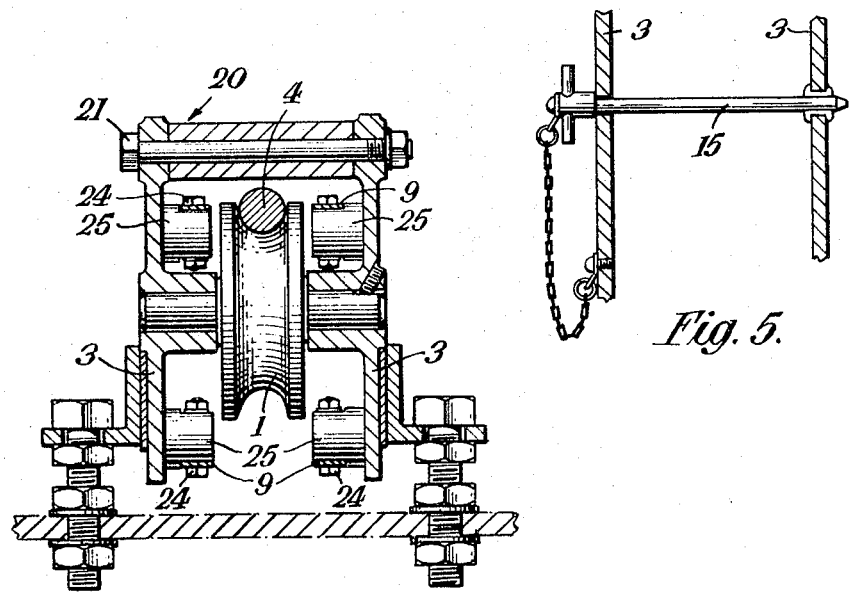
INVENTORS
Brian G. Nixon
Roy C. Preston
By Watson, Cole, Grindle & Watson
ATTORNEYS 3,310,981
DYNAMOMETERS
Brian George Nixon, Kew Gardens, Surrey, and Roy Cooper Preston, Kingston-upon-Thames, Surrey, England, assignors to Weighload Limited, Kingston-upon-Thames, Surrey, England, a British company
Filed Oct. 8, 1964, Ser. No. 402,414
Claims priority, application Great Britain, Oct. 16, 1963, 40,904/63
5 Claims. (Cl. 73—144)

A known form of dynamometer for measuring the tension in a rope, or chain, or in strip material, e.g. a metal sheet or a strip or fabric (hereinafter referred to as a rope or the like), consists of a pair of guide rollers mounted on a framework for rotation about fixed parallel axes, a sensing roller which projects into the gap between the guide rollers and bears against the portion of the rope extending between them at the side thereof remote from the guide rollers, the sensing roller being rotatable about an axis parallel to the axes of rotation of the guide rollers and mounted on the framework for movement in a direction at right angles to the common tangent to the guide rollers, and a device for measuring the load exerted by the rope on the sensing roller.

As the tensile load on the rope or the like increases, the portion extending between the guide rollers tends to straighten and thus to exert an increasing load on the sensing roller. However, the thickness of the rope tends to decrease as the tension load on it increases and it is accordingly necessary to space the guide rollers a considerable distance apart in order to reduce to a minimum the resultant error in the indication afforded by the measuring device.

With a view to providing a more accurate and less cumbersome device, the invention provides a modified form of dynamometer which comprises a pair of outer guides for engaging one side of the rope, a pair of inner guides for engaging the other side of the rope, the inner guides projecting into the gap between the outer guides, a sensing member situated between the inner guides which is effective to bear on the same side of the rope as the inner guides and to sense the tension in the rope, and a device for measuring the force exerted by the rope on the sensing member.

The indications afforded by the dynamometer according to the invention are unaffected by variations in the thickness of the material to be investigated. Thus, when the dynamometer is used for measuring the load on a rope in a crane, no adjustment need be made when the rope is exchanged for another of different diameter. Also the overall length of the dynamometer can be considerably reduced.

The load on the sensing member can be measured in any convenient way, e.g. by a hydrostatic load cell of the kind described in British specification No. 564,287, a pneumatic load cell, an electronic load cell, a steel yard or equivalent mechanical device or a spring balance.

One embodiment of dynamometer in accordance with the invention, suitable for measuring the tensile load in the rope of a crane, will now be described in more detail, by way of example, with reference to the accompanying drawings in which:

FIG. 1 is a plan view of the dynamometer,
FIG. 2 is a front elevation with the front plate of the framework removed,
FIG. 3 is a section on the line III—III in FIG. 2.
FIG. 4 is a section on the line IV—IV in FIG. 1, and
FIG. 5 is a section on the line V—V in FIG. 3.

The dynamometer includes a framework 20, constituted by a pair of parallel plates 3 joined together by bolts 21. Rotatably mounted in the framework are a pair of inner guide rollers 1 and a pair of outer guide rollers 2. These rollers are mounted to rotate on fixed parallel spindles and the inner guide rollers 1 bear against the side of the rope 4 remote from that engaged by the outer guide rollers 2 and project slightly into the gap between them. The inner rollers 1 are spaced at equal distances from the adjoining outer rollers 2.

A sensing roller 5 is rotatably mounted on a spindle 10, which is mounted in a U-shaped block 6 and extends parallel to the spindles carrying the guide rollers 1 and 2. The sensing roller 5 bears against the same side of the rope as the inner rollers 1 and is disposed midway between the rollers 1. The sensing roller 5 bears against a hydrostatic load cell 7, connected by a capillary tube 22 to a pressure gauge (not shown) which records the hydrostatic pressure in the cell 7 and is calibrated to show the load on the rope 4. The cell 7 is supported on a bracket 8, secured to the plates 3 by screws 23, and is detachably mounted on the bracket 8 by a screw 8A.

The block 6 is free to move in response to the load on the rope 4 in a direction at right angles to the common tangent to the inner guide rollers 1 but is restrained against movement in all other planes by four parallel, thin metal strips 9, which are fixed at their ends by bolts 24 to brackets 25 projecting inwardly from the plates 3 and are fixed by screws 26 to the block 6. The width of the strips 9 is such that they impose firm resistance to sideways movement of the block 6, but the strips 9 nevertheless can deflect readily to allow of movement of the block 6 towards and away from the cell 7. The tension in the strips 9 locates the block 6 and the sensing roller 5 exactly in the centre of the gap between the inner rollers 1 and the four parallel strips 9 ensure that the underface of the blocks 6 which constitutes the loading face, remains parallel to the supporting bracket 8 under all conditions.

To provide for adjustment in the ratio between the hydrostatic pressure in the cell 7 and the tension in the rope 4, the spindle 10 supporting the sensing roller 5 has end portions 11 mounted in eccentric bearing blocks 12 in the block 6. The spindle 10 has at one end a squared portion 14. By applying a wrench to this squared portion, the eccentric bearings can be rotated to raise or lower the sensing roller 5 in relation to the cell 7. A lock nut 13 serves to secure the spindle 10 in its adjusted position.

A scale may be marked on one block 12 and a cursor line on the adjacent member 11 to indicate the ratio of force on the cell 7 to the tension in the rope 4.

A lock 15, which is normally stowed in holes in the framework, may be inserted through a hole in the frame plate 3 into a hole 16 in the block 6 to support this block and protect the strips 9 against over-deflection when the load-cell 7 is removed from the framework.

In operation, the rope 4 remains in contact with the inner rollers 1 and the sensing roller 5 under all conditions although it may in certain circumstances leave contact with one of the outer rollers 2. Even if the rope should depart from contact with an outer roller, the load measurement is unaffected.

While in the construction illustrated the outer and inner guides and the sensing member are rollers, other forms of guide and sensing member may be used. Thus the guides and sensing member may be sprockets when the tension in a chain is to be measured. Moreover, it is not essential that the guides or sensing member should be rotatable, thus they may take the form of skids over which the rope or the like can slide freely. In the case of a thick rope the outer guide rollers can be replaced by clusters of guide rollers.

What we claim as our invention and desire to secure by Letters Patent is:

1. A dynamometer for measuring the tension in a rope or the like, comprising a framework, a pair of spaced outer guides mounted on the framework and serving to engage the rope at one side, a pair of spaced inner guides which are mounted on the framework and which project into the gap between the outer guides and serve to engage the rope at the other side, a sensing member which is situated between the inner guides and which is effective to bear against the rope at the same side as the inner guides and to sense the tension in the rope, a support for the sensing member, two pairs of thin parallel metal strips connected at their ends to the framework and connected intermediately of their length to the support, said strips permitting the support to move in response to the tension in the rope in a direction perpendicular to the run of the rope and restraining the support from movement in relation to the support in all other directions, means for adjusting the sensing member in relation to the support in a direction towards and away from the rope and a device for measuring the load exerted by the rope on the sensing member and tending to move the sensing member and the support away from the rope.

2. A dynamometer as claimed in claim 1, wherein the outer guides and the inner guides are constituted by rollers mounted on the framework for rotation about parallel axes.

3. A dynamometer as claimed in claim 2, wherein the sensing member is a roller mounted on the support for rotation about an axis parallel to the axes of the guide rollers.

4. A dynamometer as claimed in claim 3, wherein said adjusting means comprises bearing blocks in the support and a spindle mounted in said bearing blocks and carrying the sensing roller, said bearing blocks having eccentric portions rotatably mounted in said support.

5. A dynamometer as claimed in claim 1, wherein the load measuring device is a hydrostatic load cell which bears against the end of the support remote from the rope.

References Cited by the Examiner
UNITED STATES PATENTS

| 2,452,302 | 10/1948 | Hitchen | 73—144 |
| 2,743,606 | 5/1956 | Webber | 73—144 |
| 2,743,607 | 5/1956 | Decker | 73—144 |
| 3,080,935 | 3/1963 | Abbonizio et al. | 177—147 |

RICHARD C. QUEISSER, *Primary Examiner.*

C. A. RUEHL, *Assistant Examiner.*